(12) United States Patent
Liu et al.

(10) Patent No.: US 12,346,165 B2
(45) Date of Patent: Jul. 1, 2025

(54) FLEXIBLE DISPLAY ASSEMBLY, FLEXIBLE DISPLAY DEVICE AND METHOD FOR PREPARING FLEXIBLE DISPLAY DEVICE

(71) Applicant: BOE Technology Group Co., Ltd., Beijing (CN)

(72) Inventors: Junhuan Liu, Beijing (CN); Hong Zhu, Beijing (CN); Jiahao Zhang, Beijing (CN); Shangchieh Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 200 days.

(21) Appl. No.: 17/914,453

(22) PCT Filed: Sep. 10, 2021

(86) PCT No.: PCT/CN2021/117602
§ 371 (c)(1),
(2) Date: Sep. 26, 2022

(87) PCT Pub. No.: WO2022/089037
PCT Pub. Date: May 5, 2022

(65) Prior Publication Data
US 2023/0124365 A1    Apr. 20, 2023

(30) Foreign Application Priority Data
Oct. 26, 2020   (CN) .......................... 202011154742.1

(51) Int. Cl.
G06F 1/16        (2006.01)
(52) U.S. Cl.
CPC .................................. G06F 1/1652 (2013.01)
(58) Field of Classification Search
None
See application file for complete search history.

(56) References Cited

U.S. PATENT DOCUMENTS

| 9,684,340 B2 | 6/2017 | Han et al. |
| 9,760,129 B2 | 9/2017 | Kim et al. |

(Continued)

FOREIGN PATENT DOCUMENTS

| CN | 106409147 A | 2/2017 |
| CN | 106575664 A | 4/2017 |

(Continued)

OTHER PUBLICATIONS

International Search Report issued Feb. 22, 2022 in corresponding International Patent Application No. PCT/CN2021/117602 (with English translation), 4 pages.

(Continued)

*Primary Examiner* — Iman N Hayman
*Assistant Examiner* — Rashen E Morrison
(74) *Attorney, Agent, or Firm* — XSENSUS LLP (57) ABSTRACT

A flexible display assembly, a flexible display device and a method for preparing the flexible display device are provided. The flexible display assembly includes a flexible display panel on a side of a support member, a width of the flexible display panel being less than a width of the support member; a cover layer group on a side, away from the support member, of the flexible display panel, the width of the flexible display panel being less than a width of the cover layer group, the cover layer group, the flexible display panel and the first end of the support member forming a structure with two protruding sides and a depressed middle; and a bonding portion bonded between the first end of the support member and the first end of the cover layer group.

20 Claims, 5 Drawing Sheets

(56) References Cited

U.S. PATENT DOCUMENTS

| | | |
|---|---|---|
| 10,186,681 B2 | 1/2019 | Kang et al. |
| 10,203,531 B2* | 2/2019 | Choi et al. |
| 11,304,315 B2* | 4/2022 | Kim .................. H10K 50/8426 |
| 11,626,041 B2* | 4/2023 | Park ........................ G09F 9/301 |
| | | 361/679.01 |
| 2016/0239052 A1 | 8/2016 | Kim et al. |
| 2017/0031388 A1 | 2/2017 | Han et al. |
| 2017/0222178 A1 | 8/2017 | Kang et al. |
| 2018/0341142 A1 | 11/2018 | Choi et al. |
| 2021/0051809 A1* | 2/2021 | Song ..................... G06F 1/1652 |
| 2021/0204433 A1 | 7/2021 | Luo et al. |
| 2022/0272853 A1* | 8/2022 | Kim ...................... G06F 1/1624 |

FOREIGN PATENT DOCUMENTS

| | | |
|---|---|---|
| CN | 110211506 A | 9/2019 |
| CN | 111554195 A | 8/2020 |
| CN | 112270888 A | 1/2021 |
| WO | 2016024742 A1 | 2/2016 |

OTHER PUBLICATIONS

Written Opinion issued Nov. 15, 2021 in corresponding International Patent Application No. PCT/CN2021/117602 (with English translation), 4 pages.

Chinese Office Action issued Nov. 3, 2021 in corresponding Chinese Patent Application No. 202011154742.1 (with English translation), 17 pages.

* cited by examiner

FLEXIBLE DISPLAY ASSEMBLY, FLEXIBLE DISPLAY DEVICE AND METHOD FOR PREPARING FLEXIBLE DISPLAY DEVICE

CROSS-REFERENCE TO RELATED APPLICATION

The present disclosure is a national phase entry under 35 U.S.C. § 371 of International Application No. PCT/CN2021/117602, filed on Sep. 10, 2021 and claims the priority to Chinese Patent Application No. 202011154742.1 filed on Oct. 26, 2020, and entitled "FLEXIBLE DISPLAY ASSEMBLY, FLEXIBLE DISPLAY APPARATUS AND PREPARATION METHOD THEREFOR," the entire contents of which are incorporated herein by reference in their entireties.

TECHNICAL FIELD

The present disclosure relates to the field of display technologies, and in particular, to a flexible display assembly, a flexible display device including the flexible display assembly, and a method for preparing the flexible display device.

BACKGROUND

At present, with the development of science and technology, Organic Light-Emitting Diode (OLED) flexible display assembly is gradually widely used in curving, folding, curling and other overall configurations, so that the curl radius of OLED flexible display assembly gradually decreases, and the curl degree of freedom continuously increases, leading to the gradual increase of the curl stress of the flexible display assembly, which is prone to functional failure.

It should be noted that the above information disclosed in the "BACKGROUND" section is only used to enhance the understanding of the background of the present disclosure, and therefore may include information that does not constitute the prior art known to those of ordinary skill in the art.

SUMMARY

The purpose of the present disclosure is to provide a flexible display assembly, a flexible display device including the flexible display assembly, and a method for preparing the flexible display device.

According to an aspect of the present disclosure, a flexible display assembly is provided, including: a support member; a flexible display panel on a side of the support member, a width of the flexible display panel being less than a width of the support member, so that a first end of the support member protrudes out of the flexible display panel; a cover layer group on a side, away from the support member, of the flexible display panel, the width of the flexible display panel being less than a width of the cover layer group, so that a first end of the cover layer group protrudes out of the flexible display panel, and so that the cover layer group, the flexible display panel and the first end of the support member form a structure with two protruding sides and a depressed middle; and a bonding portion bonded between the first end of the support member and the first end of the cover layer group.

According to one aspect of the present disclosure, a flexible display device is provided, including the flexible display assembly described above.

According to one aspect of the present disclosure, a method for preparing the flexible display device as described above is provided. The method includes: providing a reel to which the barrier plate is rotatably coupled; providing a flexible display assembly, the flexible display assembly including a support member, a flexible display panel and a cover layer that are stacked in sequence; rotating the barrier plate to form an included angle between the barrier plate and the reel; bonding a side of a first end, away from the flexible display panel, of the support member to the reel; and coating a bonding portion on a side of the first end, away from the reel, of the support member, and rotating the barrier plate so that the barrier plate is bonded to the bonding portion and lapped on a side, away from the support member, of the cover layer.

Other features and advantages of the present disclosure will become apparent through the following detailed description, or will be learned in part through the practice of the present disclosure.

It should be understood that the foregoing general description and the following detailed description are only exemplary and explanatory, and do not limit the present disclosure.

BRIEF DESCRIPTION OF THE DRAWINGS

Accompanying drawings herein, which are incorporated in the specification and form a part of the specification, show embodiments conforming to the present disclosure, and are used to explain the principles of the present disclosure together with the specification. Obviously, the accompanying drawings in the following description are only some embodiments of the present disclosure, and other accompanying drawings may be obtained according to these accompanying drawings without any creative efforts by those of ordinary skill in the art.

DETAILED DESCRIPTION

The exemplary embodiments will now be described more fully with reference to the accompanying drawings. However, the exemplary embodiments can be implemented in a variety of forms, and should not be construed as limited to the embodiments described herein. On the contrary, by providing these embodiments, the present disclosure will be comprehensive and complete, and the conception of exemplary embodiments will be fully communicated to those skilled in the art. The same reference number in the figures represents the same or similar structure, and therefore their detailed description will be omitted.

According to an exemplary embodiment of the present disclosure, a flexible display assembly is first provided. With reference to a schematic diagram of a structure of the flexible display assembly according to the exemplary embodiment of the present disclosure shown in FIG. 1, the flexible display assembly may include a support member 1, a flexible display panel 2, a cover layer group 3 and a bonding portion 4. The flexible display panel 2 is provided on a side of the support member 1, and a width of the flexible display panel 2 is less than a width of the support member 1, so that a first end of the support member 1 protrudes out of the flexible display panel 2. The cover layer group 3 is provided on a side of the flexible display panel 2 away from the support member 1, and the width of the flexible display panel 2 is less than a width of the cover layer group 3, so that a first end of the cover layer group 3 protrudes out of the flexible display panel 2, and the cover layer group 3, the flexible display panel 2 and the first end of the support member 1 form a structure with two protruding sides and a depressed middle. The bonding portion 4 is bonded between the first end of the support member 1 and the first end of the cover layer group 3.

Figure 1:
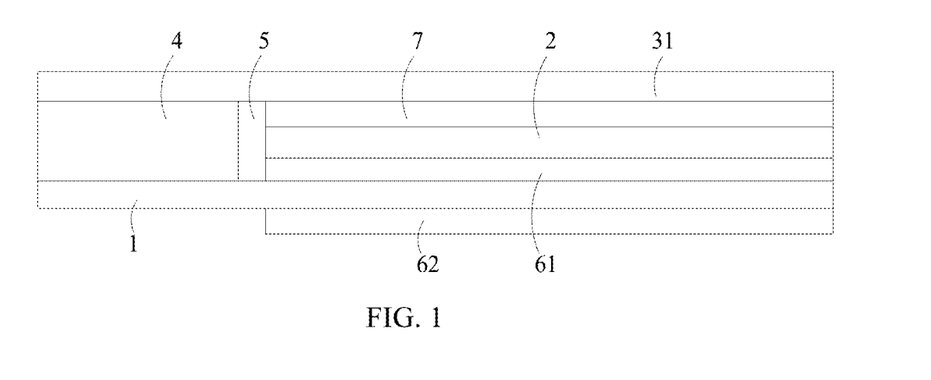
FIG. 1 is a schematic diagram of a structure of a flexible display assembly according to an exemplary embodiment of the present disclosure.

When the flexible display assembly is bent or curled, a film layer at the outer layer is subject to a tension, and a film layer at the inner layer is subject to a pressure. After the flexible display assembly is curled or bent and then unfolded, due to the characteristics of the cover layer group 3, a certain curving state will be maintained at the first end, and the cover layer group 3 will drive the flexible display panel 2 at the first end, causing the flexible display panel 2 to peel off. However, the cover layer group 3 and the support member 1 on two sides of the flexible display panel 2 are bonded through the bonding portion 4 at the first end, so that the tension on the cover layer group 3 is transferred to the bonding portion 4 at the first end, thereby avoiding peeling of the flexible display panel 2 and preventing functional failure. When the flexible display assembly is bent or curled, the stress at the starting position of the cover layer group 3 is the largest. Compared with bonding the first end of the cover layer group 3 to the flexible display panel 2, the first end of the cover layer group 3 is bonded to the support member 1, so that the stress is concentrated on the bonding portion 4 with a larger peeling force, to avoid the peeling of the film layer of the flexible display panel 2 with a small peeling force, and to prevent the surface of the cover layer group 3 from breaking. Moreover, the bonding portion 4 has a certain elasticity and ductility, which can absorb tension and pressure, thereby further reducing the curl stress and preventing functional failure.

It should be noted that the orthographic projections mentioned in the present disclosure are all in a fully unfolded state of the flexible display assembly. The length refers to a dimension in a direction consistent with the axial direction of a reel 8, and the width refers to a dimension in a direction perpendicular to the axial direction of the reel 8 and parallel to the display surface of the flexible display panel.

Figure 2:
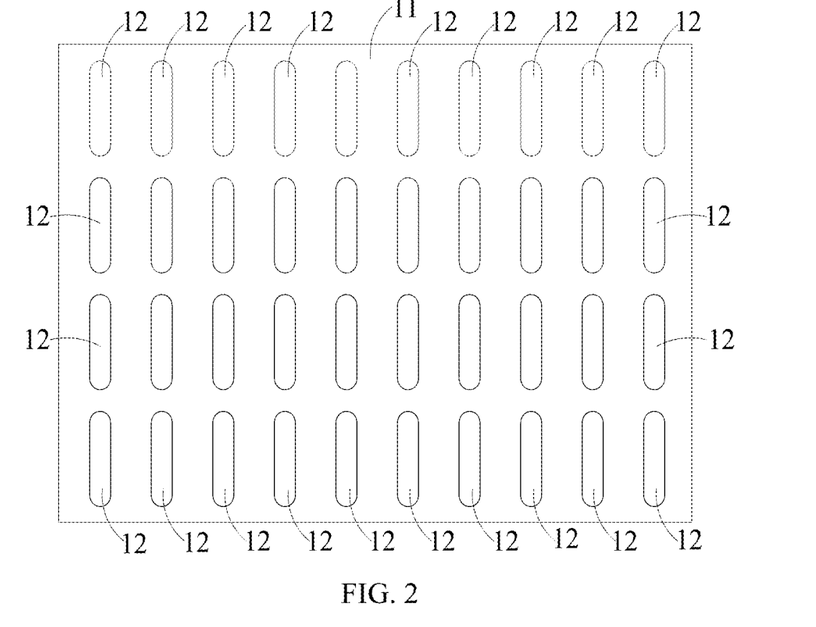
FIG. 2 is a schematic diagram of a structure of a support member in FIG. 1.

In some exemplary embodiments of the present disclosure, the support member 1 may be a metal support member. As shown in FIG. 2, the support member 1 may also include a metal supporting plate 11. A plurality of strip through holes 12 are provided on the metal supporting plate 11, and the plurality of strip through holes 12 may be arranged in array or non-array. The strip through hole 12 may be filled with silica gel, rubber, etc. The shape of the strip through hole 12 may be a waist round hole, oval, rectangular, etc. Of course, the strip through hole may also be provided as a round through hole, a square through hole, etc. Alternatively, the strip through hole 12 may not be filled with silica gel. The metal support member may be a whole surface of metal supporting plate 11, and a thickness of the metal supporting plate 11 may be greater than or equal to 30 μm and less than or equal to 300 μm. Of course, in other exemplary embodiments of the present disclosure, the support member 1 may also be made of a whole surface of colloidal material, such as silica gel, rubber, etc., and a thickness of the colloidal material may be less than or equal to 1 mm. Of course, the support member 1 may also adopt a flat plate made of colloidal material with a pattern, that is, the through hole is provided on the flat plate made of colloidal material, and the thickness of the flat plate made of colloidal material may be less than or equal to 2 mm.

In some exemplary embodiments of the present disclosure, the opposite two sides of the metal supporting plate 11 are both provided with spacer layers, which are respectively a first spacer layer 61 and a second spacer layer 62. The first spacer layer 61 is provided between the metal supporting plate 11 and the flexible display panel 2. The second spacer layer 62 is provided on a side of the metal supporting plate 11 away from the flexible display panel 2. The materials of both the first spacer layer 61 and the second spacer layer 62 may be foam, or may be colloid, such as silica gel, rubber, etc. Since the support member 1 is a metal support member with a relatively hard hardness, and the metal supporting plate 11 is provided with the strip through hole 12, some burrs or bumps will be formed inevitably when forming the strip through hole 12. During the subsequent curving or curling of the flexible display assembly, the burrs or bumps will cause damage to the film layer contacting the metal supporting plate 11 by friction. The first spacer layer 61 may be provided to avoid the damage to the flexible display panel 2 from the metal supporting plate 11. The second spacer layer 62 may prevent the metal supporting plate 11 from contacting the cover layer group 3 after the flexible display assembly is curled, thereby avoiding the damage to the cover layer group 3 by the metal supporting plate 11. Of course, in other exemplary embodiments of the present disclosure, the first spacer layer 61 and the second spacer layer 62 may not be provided, for example, in the case where the support member 1 is made of the colloidal material.

In some exemplary embodiments of the present disclosure, an orthographic projection of the first spacer layer 61 on the metal supporting plate 11 overlaps with an orthographic projection of the flexible display panel 2 on the metal supporting plate 11. That is, the length and width of the first spacer layer 61 are correspondingly equal to the length and width of the flexible display panel 2, so that a first end of the metal supporting plate 11 protrudes out of the first spacer layer 61. The bonding portion 4 is bonded between the metal supporting plate 11 and the cover layer group 3. An orthographic projection of the second spacer layer 62 on the support member 1 is located within the support member 1, so that a first end of the support member 1 protrudes out of the second spacer layer 62.

In other exemplary embodiments of the present disclosure, the length and width of the first spacer layer 61 may be correspondingly equal to the length and width of the metal supporting plate 11. In this case, the bonding portion 4 is bonded between the first spacer layer 61 and the cover layer group 3. An orthographic projection of the second spacer layer 62 on the support member 1 may overlap with the support member 1, that is, the length and width of the second spacer layer 62 may be correspondingly equal to the length and width of the metal supporting plate 11.

In some exemplary embodiments of the present disclosure, the flexible display panel 2 is provided on a side of the first spacer layer 61 away from the support member 1. The width of the flexible display panel 2 is less than the width of the support member 1, so that a first end of the support member 1 may protrude out of the flexible display panel 2, and the protruding width may be about 35 mm. Of course, the protruding width is not limited to the above description, which may be larger or smaller as required. A second end opposite to the first end of the support member 1 may be flush with the flexible display panel 2. In the length direction, the length of the flexible display panel 2 may be greater than the length of the support member 1. Of course, the length of the flexible display panel 2 may be less than or equal to the length of the support member 1.

In some exemplary embodiments of the present disclosure, a side of the flexible display panel 2 away from the support member 1 is provided with an optically clear adhesive (OCA) layer, that is, an OCA layer 7 is provided between the cover layer group 3 and the flexible display panel 2, and bonds the cover layer group 3 and the flexible display panel 2 together. Since the OCA layer 7 is used for bonding the cover layer group 3 and the flexible display panel 2, an orthographic projection of the OCA layer 7 on the support member 1 overlaps with an orthographic projection of the flexible display panel 2 on the support member 1, that is, the length and width of the OCA layer 7 are correspondingly equal to the length and width of the flexible display panel 2.

In some exemplary embodiments of the present disclosure, a side of the OCA layer 7 away from the support member 1 is provided with the cover layer group 3. The cover layer group 3 may include a cover layer 31. The orthographic projection of the flexible display panel 2 on the support member 1 is located within an orthographic projection of the cover layer 31 on the support member 1, that is, the width of the flexible display panel 2 is less than the width of the cover layer 31, so that a first end of the cover layer 31 protrudes out of the flexible display panel 2, and the protruding width may be about 35 mm. Of course, the protruding width is not limited to the above description, which may be larger or smaller as required. The width of the first end of the cover layer 31 protruding out of the flexible display panel 2 may be the same as the width of the first end of the support member 1 protruding out of the flexible display panel 2, or may also be different, as long as the bonding requirements of the bonding portion 4 and the width requirements of the gap 5 can be met. The first end of the cover layer 31 is provided opposite to the first end of the support member 1, so that the cover layer group 3, the flexible display panel 2 and the first end of the support member 1 form a structure with two protruding sides and a depressed middle. This structure and the bonding portion 4 are provided only at the first end of the flexible display assembly and are not so provided at other sides.

In some exemplary embodiments, the bonding portion 4 is bonded between the first end of the support member 1 and the first end of the cover layer 31, and the gap 5 is provided between the bonding portion 4 and the flexible display panel 2, so that a small amount of free misalignment may occur between the cover layer group 3 and the flexible display panel 2 to further release the curl stress and prevent the occurrence of functional failure. The width of gap 5 is greater than or equal to 0.1 mm and less than or equal to 2 mm. The thickness of the bonding portion 4 is less than or equal to the distance between a side close to the flexible display panel 2 of the support member 1 and a side close to the flexible display panel 2 of the cover layer 31. The width of the bonding portion 4 is less than the minimum value of the width of the first end of the cover layer 31 protruding out of the flexible display panel 2 and the width of the first end of the support member 1 protruding out of the flexible display panel 2. For example, the width of the bonding portion 4 is about 34.5 mm. Of course, the width of the bonding portion 4 is not limited to the above description, which may be larger or smaller as required, as long as the width of the bonding portion 4 can ensure that the bonding force of the bonding portion 4 is greater than the bonding force between the cover layer group 3 and the flexible display panel 2, and the bonding force between the flexible display panel 2 and the support member 1. The elastic modulus of the bonding portion 4 is approximate to the elastic modulus of the OCA layer 7, so that the force of each part of the cover layer group 3 is balanced to avoid uneven force of the cover layer group 3. For example, the elastic modulus of the bonding portion 4 is greater than or equal to 10% of the elastic modulus of the OCA layer 7 and less than or equal to 200% of the elastic modulus of the OCA layer 7, preferably 90%-110%. A hard coating (HC) film layer is also provided on the cover layer 31, and after the stress on the cover layer 31 is released, the HC film layer may also be prevented from generating cracks.

Figure 3:
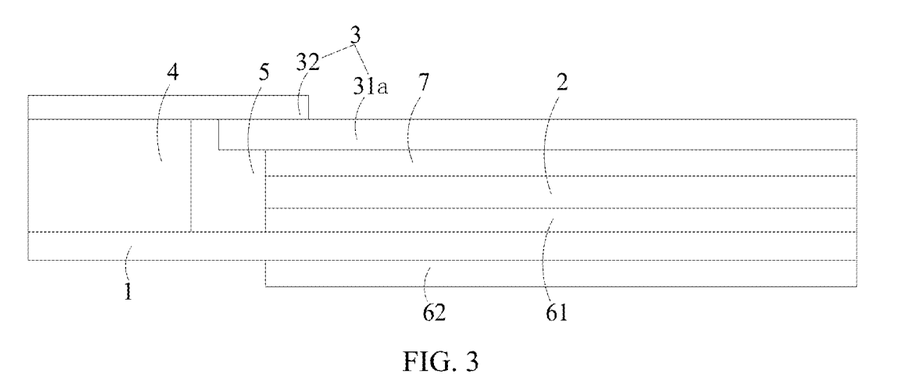
FIG. 3 is a schematic diagram of a structure of a flexible display assembly according to another exemplary embodiment of the present disclosure.

With reference to a schematic diagram of a structure of the flexible display assembly according to another exemplary embodiment of the present disclosure shown in FIG. 3, the main difference between this exemplary embodiment and the exemplary embodiment shown in FIG. 1 is the structure of the cover layer group 3.

For example, in some exemplary embodiments of the present disclosure, the cover layer group 3 may include a cover layer 31a and a barrier plate 32. The cover layer 31a is provided on a side of the flexible display panel 2 away from the support member 1, the width of the cover layer 31a is less than the width of the support member 1, and the orthographic projection of the flexible display panel 2 on the support member 1 is located within an orthographic projection of the cover layer 31a on the support member 1, so that a first end of the cover layer 31a protrudes out of the flexible display panel 2, that is, the width of the cover layer 31a is larger than the width of the flexible display panel 2 and smaller than the width of the support member 1. The width of the cover layer 31a in this exemplary embodiment is smaller than the width of the cover layer 31 in the exemplary embodiment shown in FIG. 1. Of course, in other exemplary embodiments of the present disclosure, the width of the cover layer 31a may be equal to the width of the flexible display panel 2, that is, the cover layer 31a does not protrude from the flexible display panel 2.

The barrier plate 32 is provided on a side of the cover layer 31a away from the support member 1, a first end of the barrier plate 32 is bonded to the bonding portion 4, and a second end of the barrier plate 32 opposite to the first end is lapped on the side of the cover layer 31a away from the support member 1, that is, an orthographic projection of the barrier plate 32 on the support member 1 partially overlaps with an orthographic projection of the cover layer 31a on the support member 1. The so-called lap means that the barrier plate 32 and the cover layer 31a may or may not in contact, but the barrier plate 32 and the cover layer 31a are partially overlapped. When the flexible display assembly is bent or curled, the tension or pressure on the cover layer 31a is relatively small, and due to the lap of the barrier plate, the cover layer 31a may be more freely staggered to avoid the warping of the cover layer 31a. The barrier plate 32 may be provided in a straight plate shape. In this case, the thickness of the bonding portion 4 is less than or equal to the distance between the side of the support member 1 close to the flexible display panel 2 and the side of the barrier plate 32 close to the flexible display panel 2.

Figure 6:
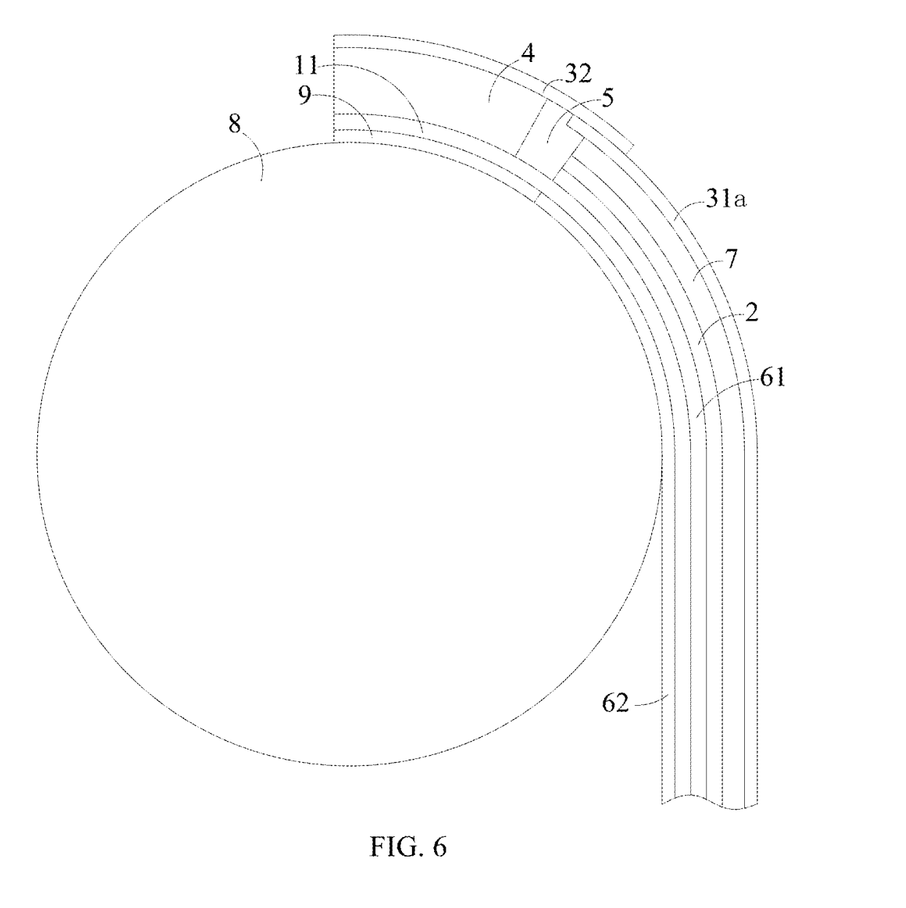
FIG. 6 is a schematic diagram of a structure of a flexible display device according to yet another exemplary embodiment of the present disclosure.

In other exemplary embodiments of the present disclosure, with reference to FIG. 6, the barrier plate 32 may be provided in a shape of circular arc, and a curving direction of the barrier plate 32 is consistent with a curving direction of the flexible display panel 2. In a flexible display device, the barrier plate 32 may be curved along the circumference of the reel 8. The barrier plate 32 is provided in a shape of circular arc, so that the gap between the barrier plate 32 and the curled flexible display panel 2 is relatively small, further avoiding the warping of the cover layer 31a. In addition, when the flexible display assembly is curled, a relatively smooth base surface is provided for the subsequent flexible display assembly wound on the barrier plate 32.

Further, a flexible display device is further provided according to some exemplary embodiments of the present disclosure. With reference to a schematic diagram of a structure of the flexible display device shown in FIG. 4, FIG. 5 and FIG. 6, the flexible display device may include the flexible display assembly described in any one of the above embodiments. The specific structure of the flexible display assembly has been described in detail above, so it will not be repeated here.

Figure 4:
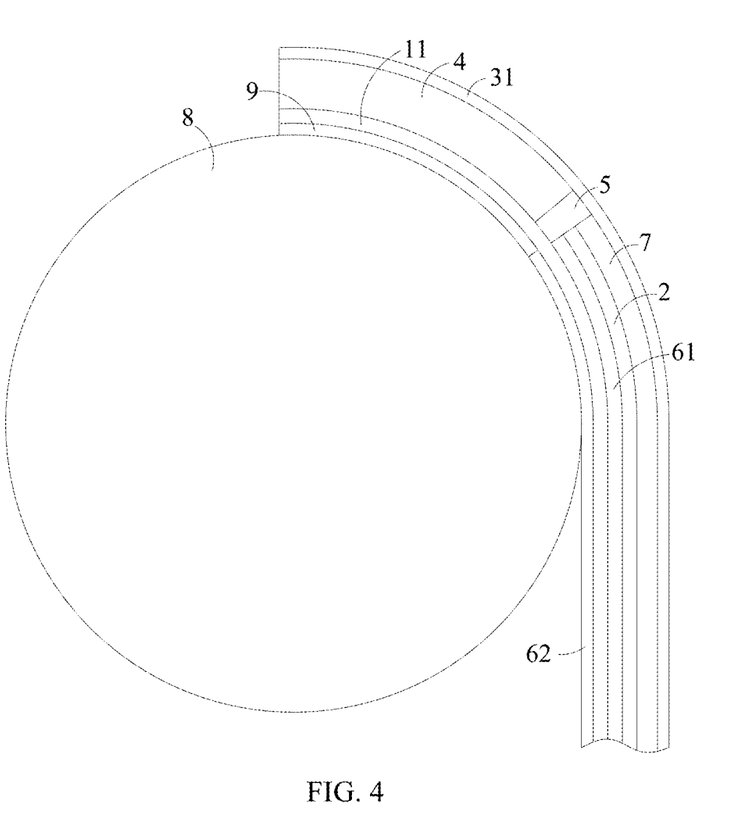
FIG. 4 is a schematic diagram of a structure of a flexible display device according to an exemplary embodiment of the present disclosure.
Figure 5:
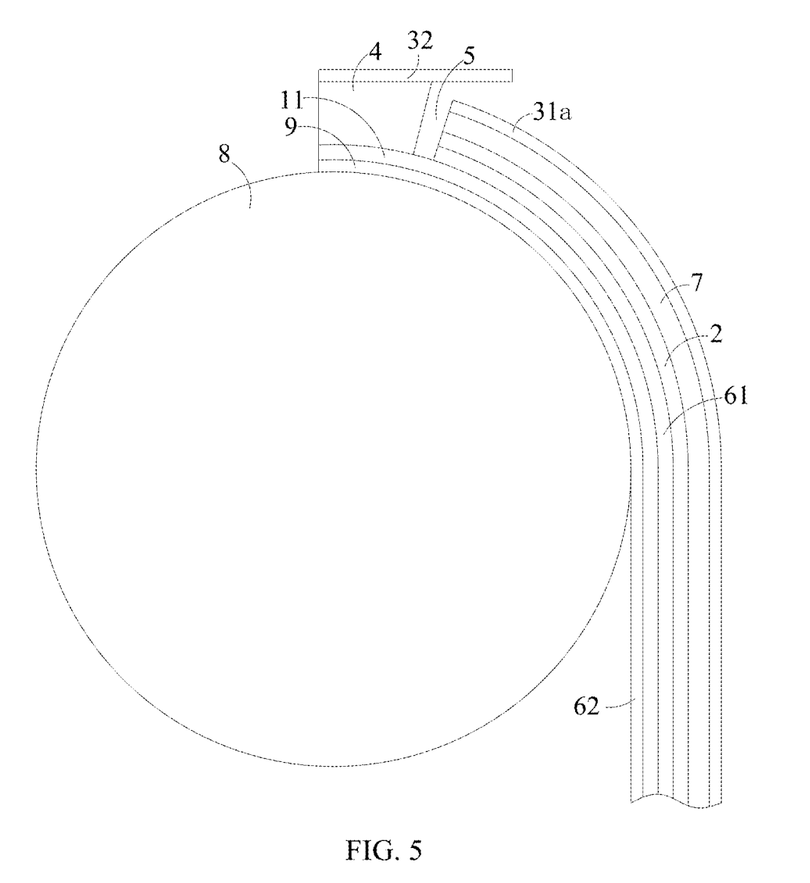
FIG. 5 is a schematic diagram of a structure of a flexible display device according to another exemplary embodiment of the present disclosure.

In some exemplary embodiments, the flexible display device may be a curlable display device, which may further include a reel 8. The reel 8 may be connected to a side of the first end of the support member 1 away from the flexible display panel 2 through a double-sided adhesive 9. The reel 8 is rotatable. The reel 8 may be rotated to drive the flexible display assembly to expand or rewind. The reel 8 may be provided in a shape of cylindrical. Of course, in other exemplary embodiments of the present disclosure, the reel 8 may be provided in a shape of prismatic. The circumferential tension is mainly conducted by the materials fixed with the reel 8. Compared with the fixation of the cover layer group 3 and the reel 8, the fixation of the support member 1 and the reel 8 makes the overall stress of the cover layer group 3 smaller, thus improving the problem of cracks arising from the tensile force of the HC film layer.

In addition, it should be noted that the flexible display device may be a foldable display device. In the foldable display device, the first end of the flexible display assembly may be bonded to a frame, which can also achieve the effect of reducing the stress after being bent.

When installing the flexible display device, the flexible display assembly may be installed in its entirety and then bonded to the reel 8 through the double-sided adhesive 9.

In the exemplary embodiment shown in FIG. 6, two ends of the barrier plate 32 in the length direction may be hinged on two ends of the reel 8, so that the barrier plate 32 may be rotated relative to the reel 8 before the display panel is installed. For example, a connecting plate perpendicular to the barrier plate 32 may be provided at each of two ends of the barrier plate 32 in the length direction. Hinge through holes are provided in the connecting plates, and hinge blind holes are provided on two ends of the reel 8. Hinge shafts hinge the connecting plates with the reel 8 through the hinge through holes and hinge blind holes.

The specific type of the flexible display device is not particularly limited, and any type of display device commonly used in the art is available, for example, a mobile device such as a mobile phone, a wearable device such as a watch, a VR device, etc. Those skilled in the art may choose accordingly according to the specific use of the display device, which will not be repeated here.

It should be noted that, in addition to the above flexible display assembly, the flexible display device further includes other necessary parts and components, such as a housing, a circuit board, a power line, etc., which may be supplemented accordingly by a person skilled in the art according to the specific use requirements of the display device, and will not be repeated here.

Compared with the prior art, the beneficial effect, of the flexible display device provided according to the exemplary embodiments of the present disclosure, is the same as the beneficial effect, of the flexible display assembly provided according to the above exemplary embodiments, and will not be repeated here.

Figure 7:
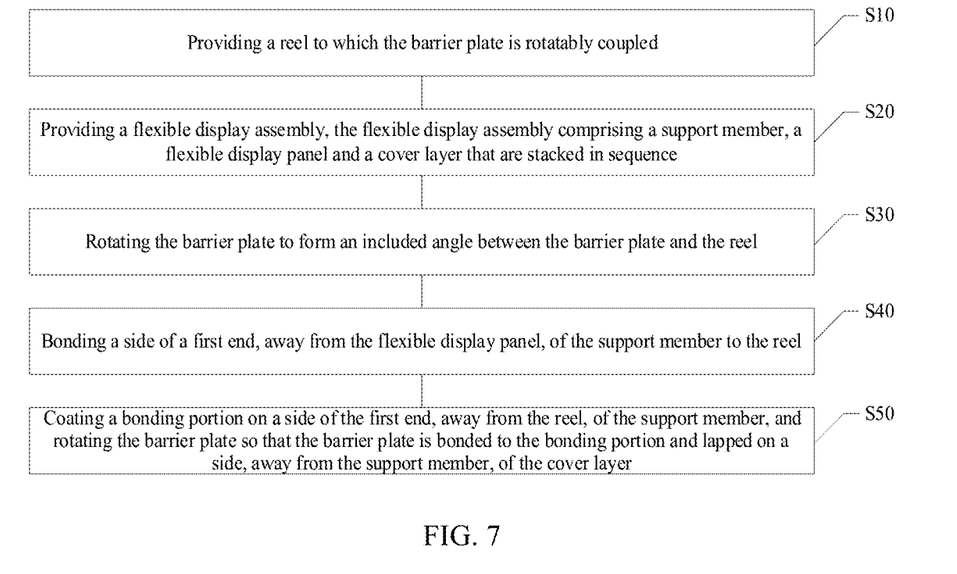
FIG. 7 is a schematic block diagram of a flowchart of a method for preparing a flexible display device of the present disclosure.

Further, referring to a schematic block diagram of a flowchart of a method for preparing a flexible display device of the present disclosure shown in FIG. 7, a method for preparing a flexible display device is further provided according to some exemplary embodiments of the present disclosure, which is used for preparing the flexible display device shown in FIG. 6. The method for preparing the flexible display device may include the following steps.

Step S10, providing a reel 8 to which the barrier plate 32 is rotatably coupled.

Step S20, providing a flexible display assembly, the flexible display assembly including a support member 1, a flexible display panel 2 and a cover layer 31a that are stacked in sequence.

Step S30, rotating the barrier plate 32 to form an included angle between the barrier plate 32 and the reel 8.

Step S40, bonding a side of a first end of the support member 1 away from the flexible display panel 2 to the reel 8.

Step S50, coating a bonding portion 4 on a side of a first end of the support member 1 away from the reel 8, and rotating the barrier plate 32, so that the barrier plate 32 is bonded to the bonding portion 4 and lapped on the side of the cover layer 31a away from the support member 1.

In some embodiments, the barrier plate 32 may be firstly hinged on the reel 8 to enable the barrier plate 32 to rotate. The flexible display assembly may include a support member 1, a flexible display panel 2, and a cover layer 31a which are stacked in sequence. The first end of the support member 1 protrudes out of the first end of the flexible display panel 2 and the first end of the cover layer 31a, and the first end of the cover layer 31a protrudes out of the first end of the flexible display panel 2. Then, the barrier plate 32 is rotated in a first direction to form an included angle between the barrier plate 32 and the reel 8. The included angle may be greater than or equal to 60 degrees and less than or equal to 90 degrees. The size of the included angle is not limited to the above description, which is enough to enable the flexible display assembly to smoothly extend into the included angle between the barrier plate 32 and the reel 8. Then, the side of the first end of the support member 1 away from the flexible display panel 2 is bonded to the reel 8 through a double-sided adhesive 9. Finally, the bonding portion 4 is coated on the side of the first end of the support member 1 away from the reel 8, and the barrier plate 32 is rotated in a second direction opposite to the first direction, so that the barrier plate 32 is bonded to the bonding portion 4 and lapped on the side of the cover layer 31a away from the support member 1.

The features, structures or characteristics described above may be combined in one or more embodiments in any suitable way, and where possible, the features discussed in the various embodiments are interchangeable. In the above description, many specific details are provided to give a full understanding of the embodiments of the present disclosure. However, those skilled in the art will realize that the technical solutions of the present disclosure may be practiced without one or more of the specific details, or other methods, assemblies, materials, etc. may be adopted. In other cases, well-known structures, materials, or operations are not shown or described in detail to avoid obscuring aspects of the present disclosure.

The terms "about" and "about" used in the specification usually mean within 20% of a given value or range, preferably within 10%, and more preferably within 5%. The quantity given here is an approximate quantity, which means that in the absence of specific description, the meaning of "about", "approximately", "roughly" and "probably" may still be implied.

Although relative terms such as "on" and "under" are used in the specification to describe the relative relationship between one assembly of an icon and another assembly, these terms are used in the specification only for convenience, such as according to the direction of the example described in the accompanying drawings. It can be understood that if the device of the icon is flipped so that it is upside down, the assembly described as being "on" will become the assembly as being "under". Other relative terms, such as "high", "low", "top" and "bottom", have similar meanings. When a certain structure is "on" other structures, it may mean that a certain structure is integrally formed on other structures, or that a certain structure is "directly" provided on other structures, or that a certain structure is "indirectly" provided on other structures through another structure.

In the specification, the terms "a", "one", "the" and "said" are used to indicate the existence of one or more elements/components/etc. The terms "contain", "include" and "have" are used to express the meaning of open inclusion and mean that there may be other elements/components/etc. besides the listed elements/components/etc. The terms "first", "second" and "third" are only used as marks, not as quantitative restrictions on their objects.

It should be understood that the present disclosure does not limit its application to the detailed structure and arrangement of the parts proposed in the specification. The present disclosure can have other embodiments, and can be implemented and performed in a variety of ways. The foregoing forms of deformation and modification fall within the scope of the present disclosure. It should be understood that the present disclosure disclosed and defined in the specification extends to all alternative combinations of two or more individual features mentioned or apparent in the text and/or accompanying drawings. All these different combinations constitute a plurality of alternative aspects of the present disclosure. The embodiments described in the specification illustrate the best known ways for realizing the present disclosure, and will enable those skilled in the art to utilize the present disclosure.

What is claimed is:

1. A flexible display assembly, comprising:
    a support member;
    a flexible display panel on a side of the support member, a width of the flexible display panel being less than a width of the support member, a first end of the support member protruding out of the flexible display panel;
    a cover layer group on a side, away from the support member, of the flexible display panel, an orthographic projection of the flexible display panel on the support member being within an orthographic projection of the cover layer group on the support member, a first end of the cover layer group protruding out of the flexible display panel, the cover layer group, the flexible display panel and the first end of the support member forming a structure with two protruding sides and a depressed middle; and
    a bonding portion bonded between the first end of the support member and the first end of the cover layer group, an overlapping area between an orthographic projection of the bonding portion on the support member and the orthographic projection of the flexible display panel on the support member being zero.

2. The flexible display assembly according to claim 1, wherein a gap is provided between the bonding portion and the flexible display panel.

3. The flexible display assembly according to claim 2, wherein a width of the gap is greater than or equal to 0.1 mm and less than or equal to 2 mm.

4. The flexible display assembly according to claim 1, wherein the cover layer group comprises:
    a cover layer, the width of the flexible display panel being less than a width of the cover layer, a first end of the cover layer protruding out of the flexible display panel and being bonded to the bonding portion.

5. The flexible display assembly according to claim 1, wherein the cover layer group comprises:
    a cover layer on the side, away from the support member, of the flexible display panel, a width of the cover layer being less than the width of the support member; and
    a barrier plate on a side, away from the support member, of the cover layer, a first end of the barrier plate being bonded to the bonding portion, and a second end opposite to the first end being lapped on the side, away from the support member, of the cover layer.

6. The flexible display assembly according to claim 5, wherein the width of the flexible display panel is less than the width of the cover layer, a first end of the cover layer protruding out of the flexible display panel.

7. The flexible display assembly according to claim 5, wherein the barrier plate is provided in a shape of circular arc, and a curving direction of the barrier plate is consistent with a curving direction of the flexible display panel.

8. The flexible display assembly according to claim 1, further comprising:
    an Optically Clear Adhesive (OCA) layer between the cover layer group and the flexible display panel.

9. The flexible display assembly according to claim 8, wherein an elastic modulus of the bonding portion is greater than or equal to 90% of an elastic modulus of the OCA layer, and is less than or equal to 110% of the elastic modulus of the OCA layer.

10. The flexible display assembly according to claim 1, wherein the support member comprises:
    a metal supporting plate on which a plurality of strip through holes are provided.

11. The flexible display assembly according to claim 10, wherein the support member further comprises:
    a first spacer layer between the metal supporting plate and the flexible display panel, a length and a width of the first spacer layer being equal to a length and a width of the metal supporting plate correspondingly, or the length and the width of the first spacer layer being equal to a length and the width of the flexible display panel correspondingly.

12. The flexible display assembly according to claim 1, further comprising:
a second spacer layer on a side, away from the flexible display panel, of the support member, an orthographic projection of the second spacer layer on the support member being within the support member, the first end of the support member protruding out of the second spacer layer.

13. A flexible display device, comprising a flexible display assembly, wherein the flexible display assembly comprises:
a support member;
a flexible display panel on a side of the support member, a width of the flexible display panel being less than a width of the support member, a first end of the support member protruding out of the flexible display panel;
a cover layer group on a side, away from the support member, of the flexible display panel, an orthographic projection of the flexible display panel on the support member being within an orthographic projection of the cover layer group on the support member, a first end of the cover layer group protruding out of the flexible display panel, the cover layer group, the flexible display panel and the first end of the support member forming a structure with two protruding sides and a depressed middle; and
a bonding portion bonded between the first end of the support member and the first end of the cover layer group, an overlapping area between an orthographic projection of the bonding portion on the support member and the orthographic projection of the flexible display panel on the support member being zero.

14. The flexible display device according to claim 13, further comprising:
a reel connected to a side of the first end, away from the flexible display panel, of the support member.

15. The flexible display device according to claim 13, wherein the barrier plate is rotatably coupled to the reel.

16. A method for preparing the flexible display device according to claim 15, wherein the method comprises:
providing the reel to which the barrier plate is rotatably coupled;
providing the flexible display assembly, the flexible display assembly comprising the support member, the flexible display panel and the cover layer that are stacked in sequence;
rotating the barrier plate to form an included angle between the barrier plate and the reel;
bonding the side of the first end, away from the flexible display panel, of the support member to the reel; and
coating the bonding portion on a side of the first end, away from the reel, of the support member, and rotating the barrier plate so that the barrier plate is bonded to the bonding portion and lapped on a side, away from the support member, of the cover layer.

17. The flexible display device according to claim 14, wherein a gap is provided between the bonding portion and the flexible display panel.

18. The flexible display device according to claim 14, wherein the cover layer group comprises
a cover layer on the side, away from the support member, of the flexible display panel, a width of the cover layer being less than the width of the support member; and
a barrier plate on a side, away from the support member, of the cover layer, a first end of the barrier plate being bonded to the bonding portion, and a second end opposite to the first end being lapped on the side, away from the support member, of the cover layer.

19. The flexible display device according to claim 18, wherein the width of the flexible display panel is less than the width of the cover layer, a first end of the cover layer protruding out of the flexible display panel.

20. The flexible display device according to claim 18, wherein the barrier plate is provided in a shape of circular arc, and a curving direction of the barrier plate is consistent with a curving direction of the flexible display panel.

* * * * *